(12) United States Patent
Lopez et al.

(10) Patent No.: US 7,456,970 B1
(45) Date of Patent: Nov. 25, 2008

(54) PULSE FINDING APPARATUS AND METHOD

(75) Inventors: Norman A. Lopez, Rochester, NY (US); Joseph L. Lippert, Rochester, NY (US); Lisa E. McConnell, Honeoye Falls, NY (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 606 days.

(21) Appl. No.: 11/156,150

(22) Filed: Jun. 17, 2005

(51) Int. Cl.
*G01C 3/08* (2006.01)

(52) U.S. Cl. .................. 356/437; 356/28; 356/5.01; 356/614; 356/337

(58) Field of Classification Search ....... 356/5.01–5.15, 356/432, 437; 250/338.5, 573; 342/194, 342/202–204
See application file for complete search history.

(56) References Cited

U.S. PATENT DOCUMENTS

| 4,874,572 | A | * | 10/1989 | Nelson et al. | ............... | 376/256 |
| 5,815,250 | A | * | 9/1998 | Thomson et al. | ........... | 356/5.01 |
| 2007/0146716 | A1 | * | 6/2007 | Dudelzak et al. | ............ | 356/437 |

OTHER PUBLICATIONS

Fukuchi, Tetsuo; Fujii, Takashi; Goto, Naohiko; Nemoto, Koshichi; Takeuchi, Nobuo □□ "Evaluation of differential absorption lidar (DIAL) measurement error by simultaneous DIAL and null profiling", Mar. 2001, Opt.Eng 40(3) 392-397 □□.*

Browell, E. V., A. F. Carter, S. T. Shipley, R. J. Allen, C. F. Butler, M. N. Mayo, J. H. Siviter, Jr., and W. M. Hall, "NASA multipurpose airborne DIAL system and measurements of ozone and aerosol profiles", Appl. Opt., 22, 522-534, 1983.*

M N A Beurskens, C J Barth, N J Lopes Cardozo and H J van der Meiden, "A high spatial resolution double-pulse Thomson scattering diagnostic; description, assessment of accuracy and examples of applications", 1999 Plasma Phys. Control. Fusion 41 1321.*

D K Killinger, N Menyuk, W E Defeo "Experimental comparison of heterodyne and direct detection for pulsed differential absorption CO2 lidar", Appl Opt. Mar. 1, 1983;22 (5):682 18195856.*

* cited by examiner

*Primary Examiner*—L. G. Lauchman
*Assistant Examiner*—Rebecca C Slomski
(74) *Attorney, Agent, or Firm*—Ratner Prestia

(57) ABSTRACT

A method of finding a temporal location of a reflected pulse in a system for remotely measuring characteristics of a target scene. The method includes steps of: (a) transmitting a pulse burst of two or more pulses toward the target scene; (b) capturing a copy of the pulse burst transmitted in step (a); (c) measuring an inter-pulse separation between at least two pulses in the pulse burst captured in step (b); (d) receiving a signal reflected from the target scene; (e) determining a temporal location of a first pulse in the signal received in step (d); and (f) determining a temporal location of a second pulse in the signal received in step (d) based on the inter-pulse separation measured in step (c). Step (a) may include transmitting an OFF-line pulse and at least one ON-line pulse in the pulse burst toward the target scene from a differential absorption LIDAR (DIAL) system, where the OFF-line pulse and the ON-line pulse are combined pulses, each individually generated from a separate pulsed laser transmitter and each having a different wavelength.

18 Claims, 9 Drawing Sheets

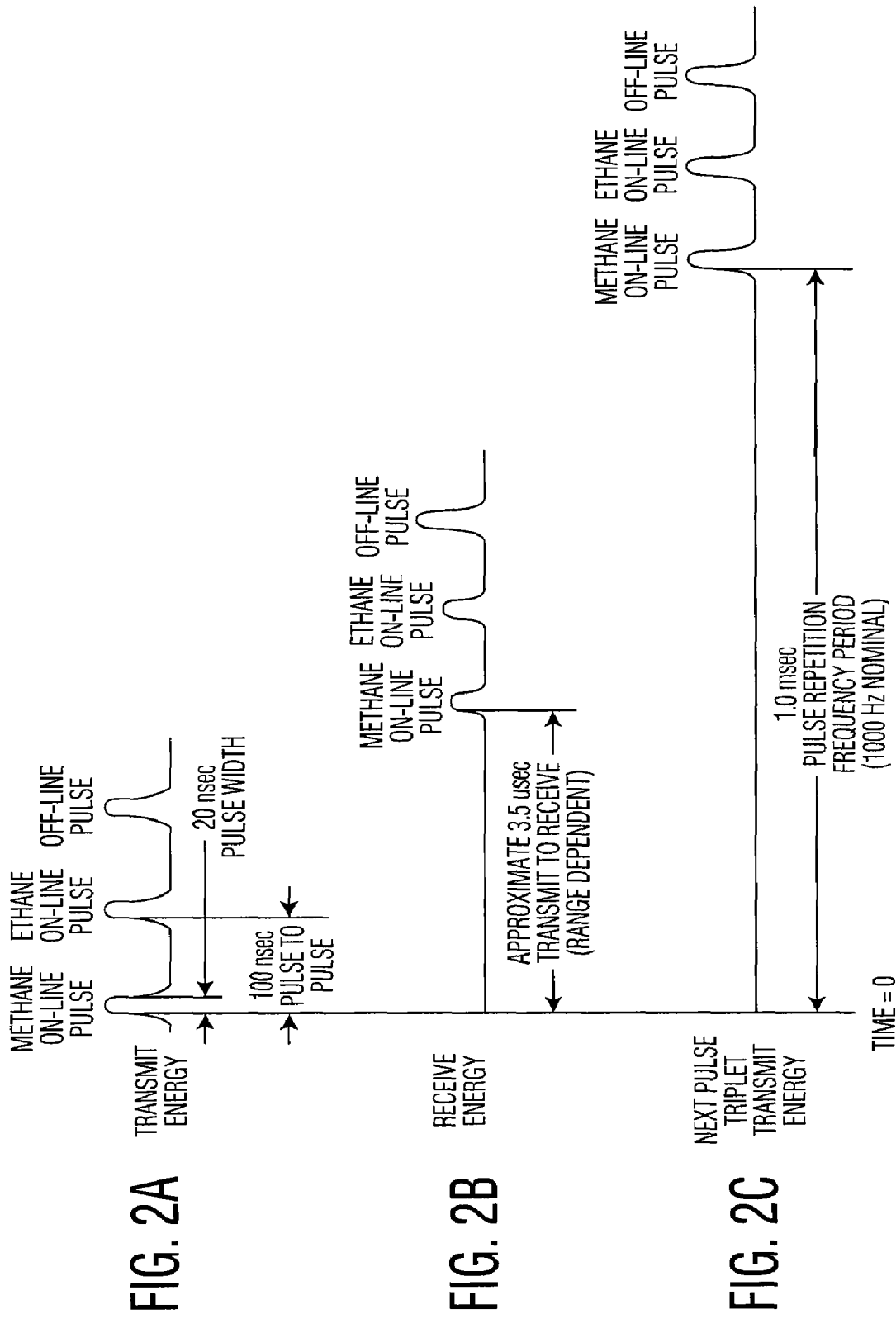

PULSE FINDING APPARATUS AND METHOD

TECHNICAL FIELD

The present invention relates, in general, to differential absorption LIDAR (DIAL) systems used to remotely measure characteristics of gases in the atmosphere. More specifically, the present invention relates to a system and method for locating laser pulses transmitted from a DIAL system and reflected back from a target scene.

BACKGROUND OF THE INVENTION

Differential absorption LIDAR (DIAL) systems may be used to remotely measure the chemical composition of gases in the atmosphere. These gases may be present in the atmosphere or they may originate from other sources, such as gas leaks stemming from natural gas pipelines.

In an exemplary DIAL system, two lasers may be used. One laser may have a wavelength selected to coincide with a strong absorption feature of the gas to be detected. The other laser may have a wavelength selected in the wing (non-absorption region) of this absorption feature. The laser tuned to the absorption feature is referred to as the ON-line laser, and the other laser, tuned to the non-absorption region, is referred to as the OFF-line laser. Other exemplary DIAL systems may have more than one ON-line and/or OFF-line laser. For example, a DIAL system may have two (or more) ON-line lasers and one (or more) OFF-line laser. These systems, typically, may be mounted and operated from an airborne platform. These systems may also be mounted and operated from a ground-based platform.

For the two laser DIAL configuration, the DIAL system generates a composite signal containing two laser pulses in temporal sequence. One pulse is from one laser and the other pulse is from the other laser. The generated composite signal, which is a combination of the two laser pulses, is transmitted by a transmitter of the DIAL system to a target scene, where it reflects off the ground (or any other surface). Part of the reflected signal is detected and recorded by a receiver of the DIAL system.

If the gas of interest is not present in the scene, as shown in FIG. 7a, and the two pulses (one OFF-line and the other ON-line) are transmitted with equal strengths, as shown in FIG. 7b, then the intensities of the two pulses in the received signal are similar to each other, as shown in FIG. 7c. If the gas of interest is present in the scene, however, as shown in FIG. 7d, and the transmitted laser pulses have equal transmit intensities, as shown in FIG. 7e, then the intensities of the two pulses reaching the receiver are different, as shown in FIG. 7f. The intensity of the ON-line pulse is smaller than the intensity of the OFF-line pulse, because energy of the ON-line pulse is attenuated upon passing through the gas.

From this difference in intensity, an approximation to the concentration path length (CPL) of the gas may be estimated. A discussion of the concentration path length, as estimated by a DIAL system, is disclosed in U.S. Pat. No. 6,822,742, issued to Kalayeh et al., on Nov. 23, 2004, and is incorporated herein by reference in its entirety.

It will be appreciated that in many DIAL systems, the receiver captures samples of the reflected signal using an analog-to-digital (A/D) converter. The number of transmitted/collected samples is large (millions per second of dwell time). The OFF-line return pulse samples, typically, have higher return intensities or energies than the ON-line return pulse samples. Furthermore, the ON-line return pulse samples, typically, are not much higher in intensity or energy than the noise samples. This low signal/noise (S/N) ratio, when the gas of interest is present in the target scene, results in ambiguities or difficulties in detecting the ON-line pulse samples. These ambiguities and difficulties degrade the detection performance of the DIAL system.

The present invention addresses this problem by providing a method for locating the ON-line pulse samples and OFF-line pulse samples that are received by the DIAL system.

SUMMARY OF THE INVENTION

To meet this and other needs, and in view of its purposes, the present invention provides a method of finding a temporal location of a pulse, received from a reflected signal, in a system for remotely measuring characteristics of a target scene. The method includes the steps of: (a) transmitting a pulse burst toward the target scene; (b) capturing a copy of the pulse burst transmitted in step (a); (c) measuring an inter-pulse separation between two pulses in the pulse burst captured in step (b); (d) capturing a signal reflected from the target scene; (e) determining a temporal location of a first pulse in the signal captured in step (d); and (f) determining a temporal location of a second pulse in the signal captured in step (d) based on the inter-pulse separation measured in step (c).

Step (a) of the method may include transmitting an OFF-line pulse and at least one ON-line pulse in the pulse burst toward the target scene from a differential absorption LIDAR (DIAL) system, where the OFF-line pulse and the ON-line pulse are combined pulses, each individually generated from a separate pulsed laser transmitter and each having a different wavelength.

Step (e) of the method may include determining a temporal location of a pulse having a maximum peak level in the signal, and denoting that pulse as the first pulse found in the signal. Step (f) of the method may include determining the location of the second pulse in the signal by summing the temporal location of the first found pulse with the inter-pulse separation measured in step (c).

Another embodiment of the invention includes a second method of finding a temporal location of a reflected pulse in a system for remotely measuring characteristics of a target scene. The second method includes the steps of: (a) transmitting a stream of pulse bursts toward the target scene; (b) sampling a copy of the stream transmitted in step (a); (c) determining first and second sample numbers as respective locations of first and second found pulses in the stream of pulse bursts sampled in step (b); (d) forming a digital filter; (e) convolving a stream of pulses, received from a signal reflected from the target scene, with the digital filter to generate a discrete signal; (f) locating a highest peak point in the discrete signal and denoting the point as a temporal location of a first pulse found in the reflected stream that corresponds to the first pulse in the stream of pulse bursts sampled in step (b); (g) measuring an inter-pulse separation between the first found pulse and the second found pulse in the stream of pulse bursts sampled in step (b); and (h) determining a location of the second found pulse in the reflected stream based on the temporal location of the first found pulse located in step (f) and the inter-pulse separation measured in step (g).

The second method includes forming the digital filter, h[n], of length $L_F=LOC_1{}^C+LOC_2{}^C$, which may be defined as follows:

$$h[n] = \begin{cases} 1 & \text{when} & n = 0 \\ 1 & \text{when} & n = LOC_1^C + LOC_2^C - 1 \\ 0 & \text{otherwise} \end{cases}$$

where $LOC_1{}^C$ is the sample number of the maximum value of the first pulse found in the transmitted stream of pulse bursts, $LOC_2{}^C$ is the sample number of the maximum value of the second pulse found in the transmitted stream of pulse bursts, and n is an integer of a number of samples.

Step (a) of the second method may include transmitting the stream of pulse bursts having an OFF-line pulse and at least one ON-line pulse from a differential absorption LIDAR (DIAL) system, where the OFF-line pulse and the ON-line pulse are combined pulses, each individually generated from a separate pulsed laser transmitter and each having a different wavelength.

Yet another embodiment of the present invention is a system having a transmitter for transmitting a pulse burst toward a target scene and a receiver for receiving a signal reflected from the target scene. The system includes a capture system, coupled to the transmitter, configured to capture a copy of the pulse burst transmitted from the transmitter. The system further includes a parameter estimation module, coupled to the capture system, for measuring an inter-pulse separation between two pulses in the copied pulse burst transmitted from the transmitter. Also included is a pulse finding module, coupled to the receiver and the parameter estimation module, for determining temporal first and second locations of first and second pulses, respectively, in the signal received by the receiver. The temporal location of the second pulse is determined based on the inter-pulse separation measured by the parameter estimation module.

The pulse finding module of the system is configured to determine a temporal location of a pulse having a maximum peak level in the signal received by the receiver, and denote that pulse as the first pulse, and configured to determine the location of the second pulse by summing the temporal location of the first pulse with the inter-pulse separation measured by the parameter estimation module.

The first pulse of the signal received by the receiver may be processed as an OFF-line pulse received from a DIAL system, and the second pulse of the signal received by the receiver may be processed as an ON-line pulse, separately received from the DIAL system.

Still another embodiment of the invention is a second system having a transmitter for transmitting a stream of pulse bursts toward a target scene, and a receiver for receiving a signal reflected from the target scene. The second system includes a capture system, coupled to the transmitter, configured to sample a copy of the stream of pulse bursts transmitted from the transmitter. Also included is a parameter estimation module, coupled to the capture system, for determining first and second sample numbers, as respective locations of the maximum values of the first and second found pulses in the stream of pulse bursts transmitted from the transmitter, and for measuring an inter-pulse separation between the first and second found pulses. The second system further includes a pulse finding module having a digital filter, coupled to the receiver and the parameter estimation module, for (a) convolving a stream of pulses, received from a signal reflected from the target scene, with the digital filter to generate a discrete signal, (b) locating a highest peak point in the discrete signal and denoting the point as a temporal location of a first pulse found in the reflected stream that corresponds to the first pulse in the stream of pulse bursts, and (c) determining a location of the second pulse found in the reflected stream based on the temporal location of the first found pulse and the inter-pulse separation.

The digital filter, h[n], is of length $L_F=LOC_1{}^C+LOC_1{}^C$, and may be defined as follows:

$$h[n] = \begin{cases} 1 & \text{when} & n = 0 \\ 1 & \text{when} & n = LOC_1^C + LOC_2^C - 1 \\ 0 & \text{otherwise} \end{cases}$$

where $LOC_1{}^C$ is the sample number of the maximum value of the first pulse found in the transmitted stream of pulse bursts, $LOC_2{}^C$ is the sample number of the maximum value of the second pulse found in the transmitted stream of pulse bursts, and n is an integer of a number of samples.

The transmitter of the second system may be configured to transmit the stream of pulse bursts as an OFF-line pulse and at least one ON-line pulse from a differential absorption LIDAR (DIAL) system, where the OFF-line pulse and the ON-line pulse are combined pulses, each individually generated from a separate pulsed laser transmitter and each having a different wavelength.

It is understood that the foregoing general description and the following detailed description are exemplary, but are not restrictive, of the invention.

BRIEF DESCRIPTION OF THE DRAWING

The invention is best understood from the following detailed description when read in connection with the accompanying drawing. Included in the drawing are the following figures:

FIGS. 2A through 2C illustrate an exemplary pulse burst of three pulses transmitted from a DIAL system and received by the DIAL system, at a pulse repetition frequency of 1000 hertz, nominal, in accordance with an embodiment of the present invention;

DETAILED DESCRIPTION OF THE INVENTION

As will be explained, a method of the present invention captures and analyzes samples of received laser pulses, in addition to any other signal processing techniques used in the DIAL system. The present invention also provides a method that automatically determines the presence and location of a return pulse, without operator assistance.

It will be appreciated that this method may be used with any signal processing technique and is not limited to a DIAL system. It may be used in capturing and analyzing samples of a burst of pulses, in which the pulses in the burst have differing receive peak power levels and some of the pulses may have peak levels that are close to the noise level of the system.

The present invention captures pulse sample data and determines where the samples corresponding to different laser returns are located in the captured pulse data. For situations where there is a gas present in the object scene, the low intensity of the reflected ON-line pulse combined with the noise introduces challenges that are overcome by the present invention. As will be described, the present invention correctly determines the temporal locations of the reflected laser pulses.

It will be appreciated that the time of each of the return pulses reaching the receiver may vary as a function of scene content, laser pointing angle, variation in transmission time, and variations in inter-pulse separation. The method of the present invention advantageously does not expect that a return pulse be located at any particular time and, instead, allows the location of the pulses to vary from transmitted signal to transmitted signal. The present invention determines the location of the return pulses and advantageously allows for precise and accurate measurements of the concentration path length, range-to-target, signal-to-noise ratio, etc.

In one embodiment of the invention, a method determines the location of the pulses in the reflected signal, based on finding peaks in the captured samples. In another embodiment of the invention, another method determines the location of the pulses, based on a semi-matched filter operation. Both embodiments are described in detail below. It will be understood that both embodiments may be used in any system, including a DIAL system, which captures a pulse burst that results from two or more separately transmitted pulses.

Figure 1:
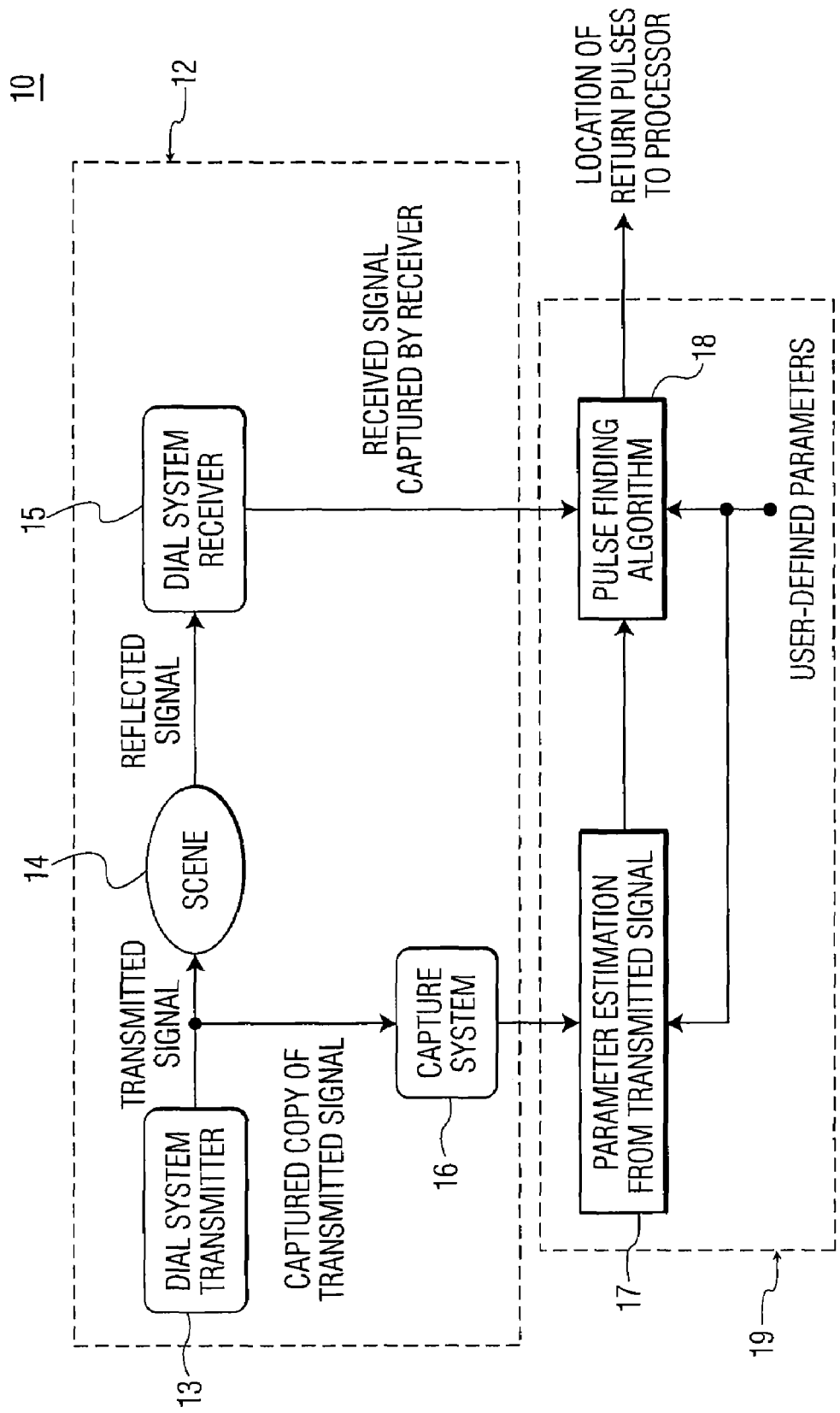
FIG. 1 is a block diagram of a DIAL system including a pulse finding module for locating a pulse of a signal reflected from a target scene, in accordance with an embodiment of the present invention.

Referring first to FIG. 1, there is shown a DIAL system, generally designated as 10, which includes DIAL system transmitter 13 and DIAL system receiver 15. A transmitted signal, formed from combined laser pulses, is transmitted from transmitter 13 through target scene 14. The transmitted signal may include at least one ON-line laser pulse train and one OFF-line laser pulse train. A portion of the transmitted signal is reflected from target scene 14 and returned to DIAL system receiver 15.

Another exemplary combined signal that includes three pulses in a pulse burst is shown in FIGS. 2A, 2B and 2C. The transmitted pulse train includes two ON-line pulses (one for methane and one for ethane) and one OFF-line pulse. The received pulse train includes three pulses that are temporally related to the transmitted pulse train, but are delayed due to the two way distance between the DIAL system and the target scene. FIG. 2C depicts the pulse repetition interval of each of the three laser pulses. The pulse widths, pulse intervals and pulse repetition intervals are merely exemplary and are not intended to limit the scope of the present invention.

Returning to FIG. 1, DIAL system 10 includes capture system 16 which is configured to capture a copy of the transmitted signal. The returned signal, or received signal, is captured by receiver 15 and sent to pulse finding algorithm module 18. In a similar manner, the captured copy of the transmitted signal, which is captured by capture system 16, is provided to parameter estimation module 17.

As will be explained, user defined parameters are inputted to pulse finding algorithm module 18 and parameter estimation module 17. Parameter estimation module 17 estimates an inter-pulse separation that should be present in the returned pulses, based on the user defined parameters. The pulse finding algorithm module determines the location of the returned pulses, based on inputs from the parameter estimation module. The location of the returned pulses may be provided to a processor or controller used by DIAL system 10.

As shown, DIAL system 10 is schematically divided into a hardware portion, generally designated as 12, and an algorithm portion, generally designated as 19. This clear division is shown for purposes of clarity only and is not intended to limit the scope of the present invention.

From the captured copy of the transmitted signal, the temporal separation between the laser pulses is estimated in module 17. The estimated temporal difference, along with user-defined parameters are provided to pulse finding algorithm 18. Using these parameters, the location of the return pulses is determined by pulse finding algorithm module 18, based on the received signal captured by DIAL system receiver 15.

In order for the parameter estimation module and the pulse finding algorithm module to perform their tasks, certain quantities may be specified by the user. These quantities may be set by the "User" in a "Configuration" file and then applied to the processing of all the pulses captured in a predetermined data collection period. Some of the parameters may be specified in the "Configuration" file, so that the algorithms may perform their tasks more quickly.

The parameters in the "Configuration" file are user defined parameters and may include the following six parameters (numbered 1 to 6):

1. Pulse Width, PW.

Figure 3A:
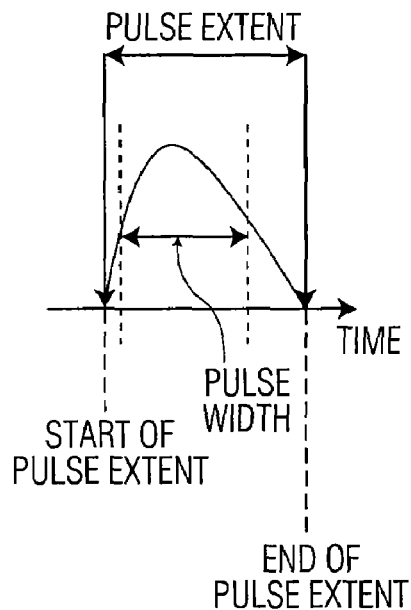
FIG. 3A is an illustration of a pulse including parameters of the pulse, as defined for an algorithm used by the pulse finding module in the system of FIG. 1, in accordance with an embodiment of the present invention.

This quantity is defined as the temporal extent from the half-peak point of the left side of the peak pulse to the half-peak point of the right side of the peak pulse, as shown in FIG. 3A. The unit of PW is seconds.

2. Scale factor defining lower limit of pulse extension, $\alpha_L$.

Scale factor, $\alpha_L$, is used by the parameter estimation module and the pulse finding algorithm module to define the start location of the extent of the laser pulse, as shown in FIG. 3A. This scale factor is unit-less.

3. Scale factor defining upper limit of pulse extension, $\alpha_U$.

Scale factor, $\alpha_U$, is used by the parameter estimation module and the pulse finding algorithm module to define the end location of the extent of the laser pulse, as shown in FIG. 3A. This scale factor is unit-less.

4. Range window start, $R_S$.

Figure 3B:
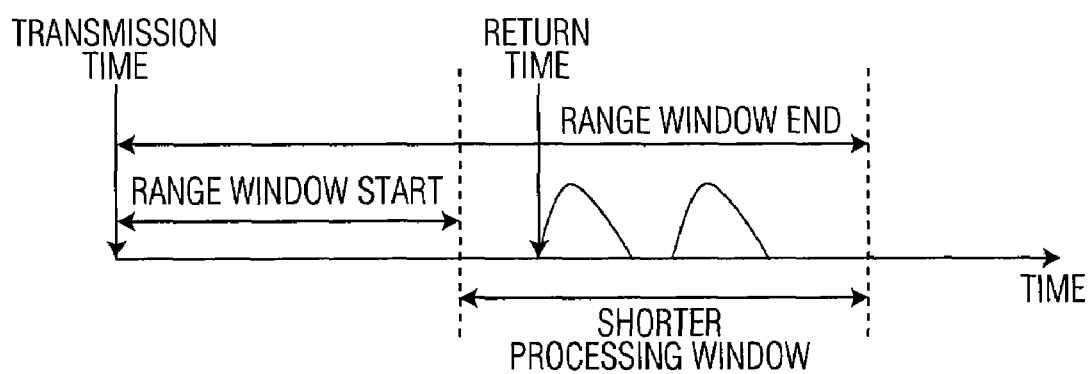
FIG. 3B is an illustration of additional parameters of a transmitted and returned pulse, as defined for an algorithm used by the pulse finding module in the system of FIG. 1, in accordance with an embodiment of the present invention.

This parameter defines the starting point of the processing window used in the algorithm. The processing window is shorter than the whole window in which samples may be collected, as shown in FIG. 3B. Processing samples that only fall within this shorter window decreases the number of samples that need to be processed, which in turn decreases memory usage, as well as computational time. This quantity is specified in meters and may be converted to a two-way travel time in meters.

5. Range window end, $R_E$.

This parameter defines the end point of the processing window used in the algorithm, as shown in FIG. 3B. This quantity is specified in meters and may be converted to a two-way travel time in meters.

6. Inter-pulse separation threshold, $\Delta_{TH}$ (only applies to the peak-based algorithm used by one embodiment of the present invention).

Only the peak-based algorithm uses this parameter. It represents an allowable threshold in the inter-pulse separation between pulses in a pulse burst. Usage of this parameter is discussed in more detail later, with reference to FIG. 4A.

The aforementioned six parameters are user-defined parameters. There are other parameters that are used by the parameter estimation module and the pulse finding algorithm module. These parameters, which are intrinsic to the system, include pulse order, (PO) and sampling rate of the capture system (Ts).

The pulse order indicates the sequence in which the laser pulses are transmitted to the object scene. For example, an Online-Offline pulse order corresponds to the ON-line pulse transmitted first in the stream and the OFF-line pulse transmitted next in the sequence of the stream.

The sampling rate of the capture system indicates the sampling rate at which the capture system collects samples. For example, 500 MegaSamples/second indicates that the capture system collects 500,000,000 samples for every one second of transmitted signal.

Figure 4A:
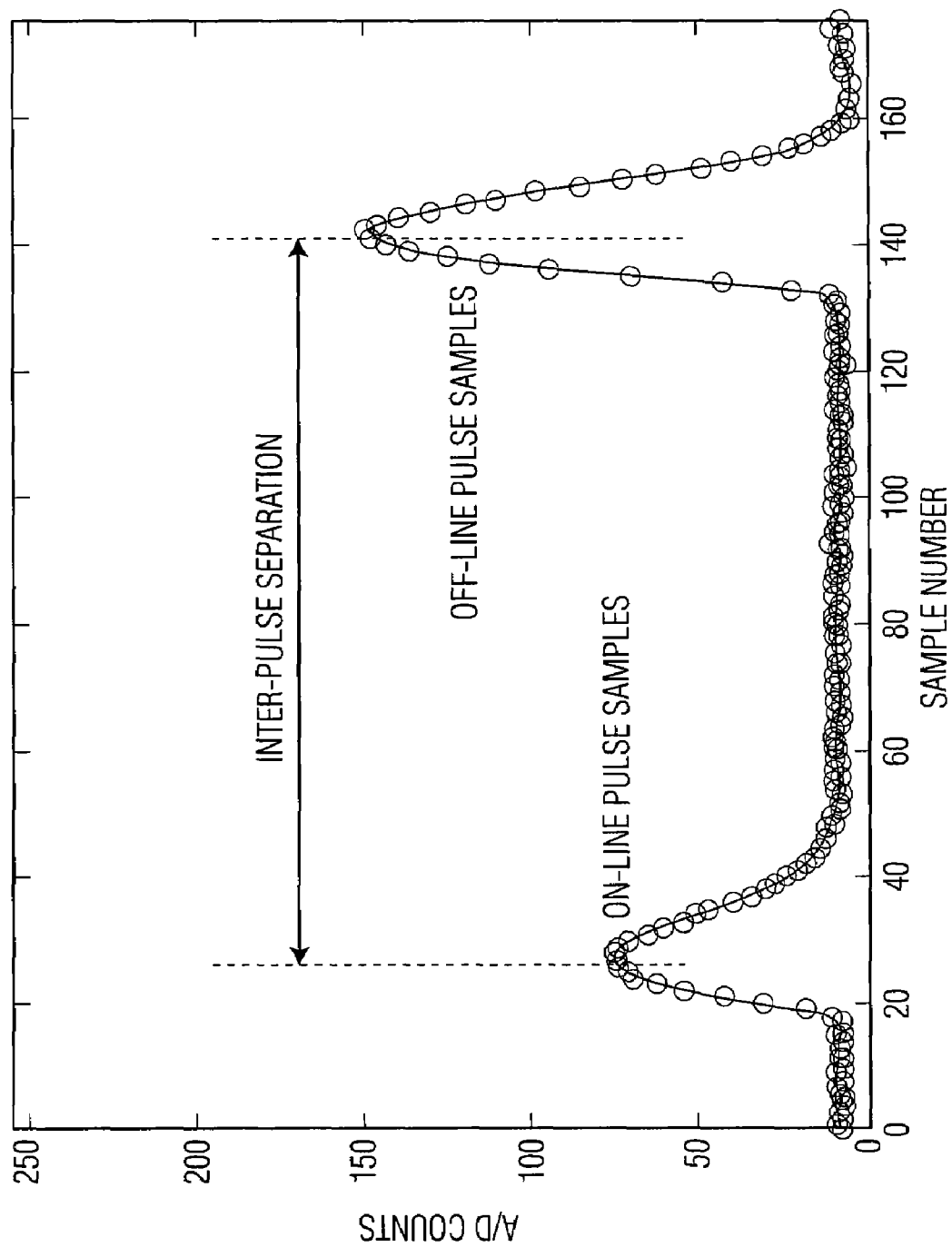
FIG. 4A is an illustration of analog/digital (A/D) counts versus sample number, depicting an inter-pulse separation between ON-line pulse samples and OFF-line pulse samples of a pulse data stream, in accordance with an embodiment of the present invention.

An algorithm, or method, used by the present invention to estimate the temporal inter-pulse separation for a specific pulse burst in a data stream will now be described. Both pulse finding methods (peak-based method and semi-matched filter method) utilize this estimated quantity. A signal on which this estimation is performed corresponds to a copy of the transmitted signal from DIAL system transmitter 13 as captured by capture system 16 (FIG. 1). This transmitted signal is cleaner than the target-reflected return, because it does not contain as much noise (unwanted variations). The pulses are easily processed by the capture system, as shown in FIG. 4A.

The steps of an algorithm/method of finding the location of pulses in the captured signal is enumerated below (numbered as steps 1 through 5):

Step 1. Find the peak value, or highest value, in the sample stream.

Next, record the intensity (peak value) and location (sample number), as follows:

$$PV_1^C \ \& \ LOC_1^C$$

where:
"C" denotes the transmitted signal captured by capture system 16 (as shown in FIG. 1), and "1" denotes the first pulse found in the sequence (may be the first or the second pulse in the sequence).

Step 2. Estimate the pulse sample extent from system and user-defined parameters.

$$SE_{Lower} = \lfloor a_L \times PW \times T_s \rfloor \quad (1)$$

$$SE_{Upper} = \lfloor a_U \times PW \times T_s \rfloor.$$

The quantities calculated in Equation 1 have units of samples (or sample number). The $\lfloor \ \rfloor$ corresponds to a round operation to obtain integer numbers for the samples. As an example, these quantities may have a value of 10 sample number and 20 sample number, respectively. Using these values, the start of the pulse may be located, for example, as a peak location of 140 sample number (FIG. 4A) minus 10 sample number, which equals 130 sample number. These values may also be converted into seconds, thereby providing a temporal relationship.

Figure 4B:
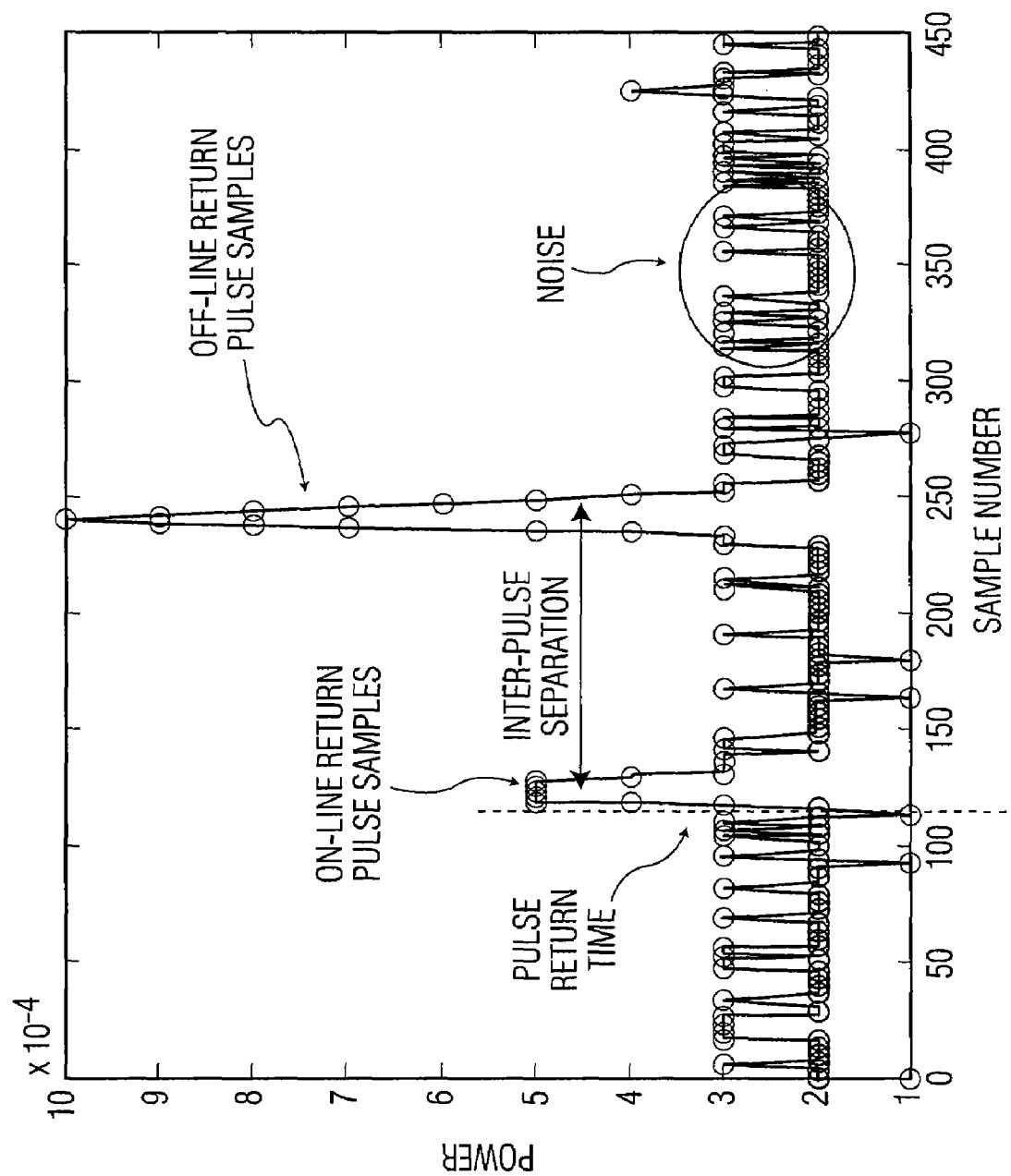
FIG. 4B is an illustration of power versus sample number showing temporal locations, in sample numbers, of the ON-line return pulse and the OFF-line return pulse, in the presence of system noise.

FIG. 4A shows the temporal relationship between two pulse samples, one being ON-line pulse samples and the other being OFF-line pulse samples. FIG. 4A, however, does not set show the relationship of these pulse samples with the receiver detected noise. An example of a collected return signal for a two-laser DIAL system with noise samples is shown in FIG. 4B.

Figure 5A:
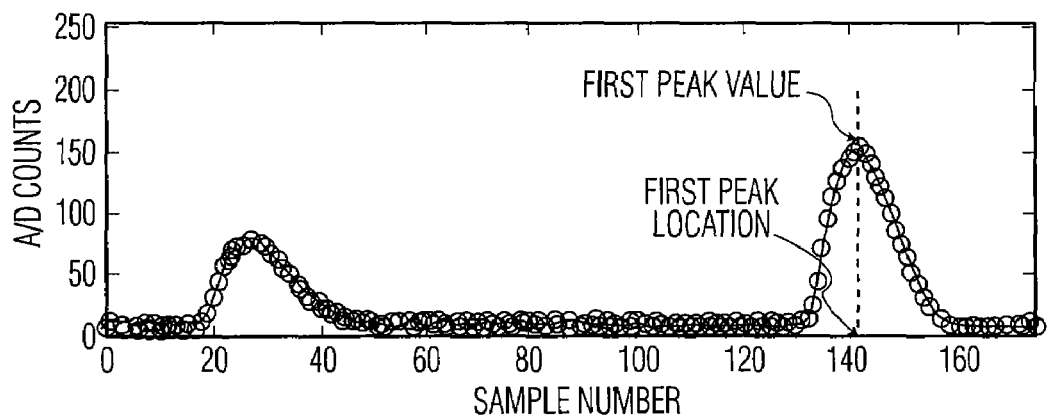
FIG. 5A is an illustration of a received pulse burst of a data stream including a peak OFF-line pulse located at a certain sample number and a smaller ON-line pulse located at a different sample number.
Figure 5B:
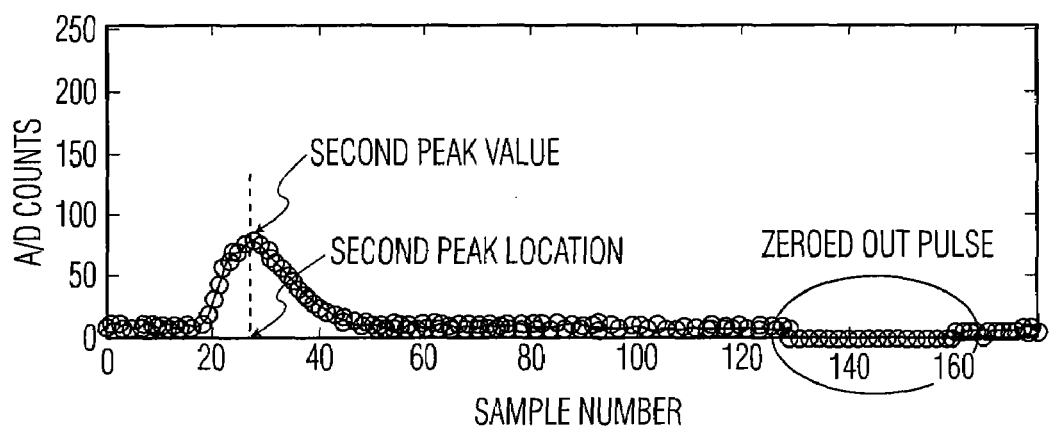
FIG. 5B is an illustration of setting to zero (zeroing) of the peak pulse previously detected at the sample location shown in FIG. 5A, in accordance with an embodiment of the present invention.

Step 3. Using $SE_{Lower}$ and $SE_{Upper}$, zero-out (or set to zero) the region of the pulse having the peak value found in Step 1, as shown in FIGS. 5A and 5B.

Step 4. Locate another peak value from the signal containing the zeroed-out pulse. Next, record the intensity (peak value) and location (sample number), as follows:

$$PV_2^C \ \& \ LOC_2^C$$

where:
"C" denotes the transmitted signal captured by capture system 16 (as shown in FIG. 1), and "2" denotes the second pulse found in the sequence (may be the first or later pulse in the sequence).

Step 5. Calculate the inter-pulse separation, $\Delta T$, per Equation 2, as follows:

$$\Delta T = |LOC_1^C - LOC_2^C| \quad (2)$$

The quantity $\Delta T$ of Equation 2 is recorded and made available to the pulse finding algorithm, which is either peak-based or semi-matched filter-based. It will be appreciated that the quantity $\Delta T$ is in units of sample number, or it may be converted into units of seconds, thereby providing a temporal relationship.

The aforementioned steps 1 through 5 may be used in both methods of the present invention. One of these two methods will now be described and is sometimes referred to as the peak based pulse finding algorithm.

The peak-based pulse finding algorithm finds the location of the pulses in the reflected signal, by executing the following steps (enumerated as steps 6 through 10):

Step 6. Find the peak value, or highest value, in the sample stream of the captured reflected signal. Next, record the intensity (peak value) and location (sample number), as follows:

$$PV_1^R \ \& \ LOC_1^R,$$

where
"R" denotes reflected or received signal captured by receiver 15 (FIG. 1), and
"1" denotes the first pulse found in the sequence (may be the first or later pulse in the sequence).

Step 7. Estimate the pulse sample extent from system and user-defined parameters (as done in Step 2 for the captured transmitted signal).

Step 8. Using $SE_{Lower}$ and $SE_{Upper}$, zero-out (or set to zero) the region of the pulse having the peak found in Step 1 (as performed in Step 3 for the captured transmitted signal).

Step 9. Locate another peak value from the signal containing the zeroed-out pulse. Next, record the intensity (peak value) and location (sample number) of this other peak value, as follows:

$PV_2^R$ & $LOC_2^R$, where
"R" denotes reflected, or received signal captured by receiver 15 (FIG. 1) and
"2" denotes the second pulse found in the sequence (may be the first or later pulse in the sequence).

Step 10. The location of the pulses in the captured reflected signal is determined using the following sub-steps (enumerated as sub-steps (a) through (d)):

Sub-step (a). Calculate the maximum allowable inter-pulse separation (AMAX) from the inter-pulse separation threshold ($\Delta_{TH}$) specified by the user and the calculated inter-pulse separation of the captured transmitted signal ($\Delta T$), as per Equation 3:

$$\Delta_{MAX} = [\Delta_{TH} \times \Delta T] \quad (3)$$

Each of the quantities in Equation (3), similarly to the other Equations may be expressed in units of samples (sample number) or converted to seconds.

Sub-step (b). Using the peak locations determined from the reflected pulses in the stream of pulse bursts, estimate an inter-pulse separation $\Delta_R$, as per Equation 4:

$$\Delta_R = |LOC_1^R - LOC_2^R| \quad (4)$$

where $\Delta_R$ is expressed in units of sample (sample number) or may be converted into seconds.

Sub-step (c). If $\Delta_R$ is contained in the interval of $[\Delta T - \Delta_{MAX}, \Delta T + \Delta_{MAX}]$, then assign locations $LOC_1^R$ and $LOC_2^R$ as the return pulse locations. The specific assignment is based on the pulse order or sequence (1 before 2, or 2 before 1). This situation may occur when the intensities of both laser pulses (ON-line and OFF-line) in the captured reflected signal are both observable (likely to occur when there is no gas present).

Sub-step (d). If $\Delta_R$ is NOT contained in the interval of $[\Delta T - \Delta_{MAX}, \Delta T + \Delta_{MAX}]$, then assign the location of the highest peak value, $LOC_1^R$, to the OFF-line laser pulse. It will be appreciated that if the temporal separation between the found reflected peaks do not match the separation of the pulses transmitted to the object scene, the intensity of the ON-line pulse is likely not observable in the return signal, because a gas is present.

Figure 6:
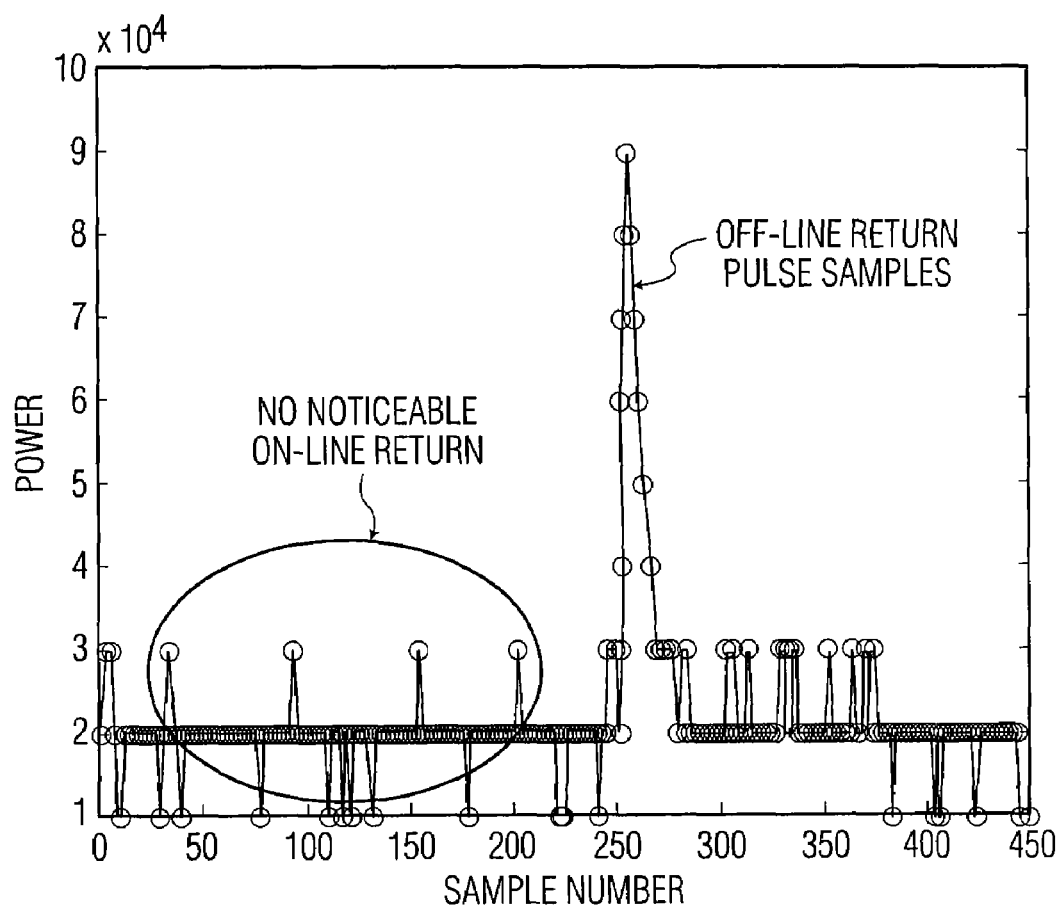
FIG. 6 is an illustration of a reflected received signal, in which the OFF-line return pulse is detectable and the ON-line return pulse is not detectable due to noise in the system.
Figure 7A:
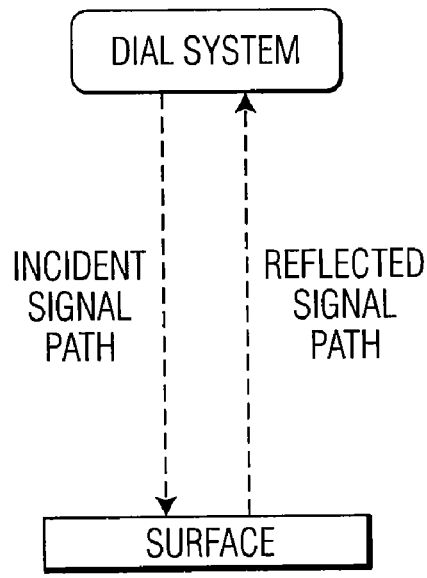
FIGS. 7A through 7C are illustrations of a conventional DIAL system depicting comparable return intensities for the ON-line pulse and the OFF-line pulse, is in the absence of a target gas.
Figure 7B:
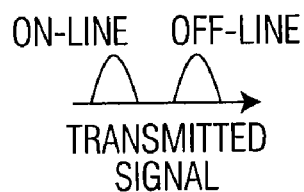
Figure 7C:
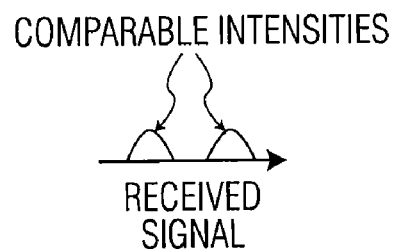
Figure 7D:
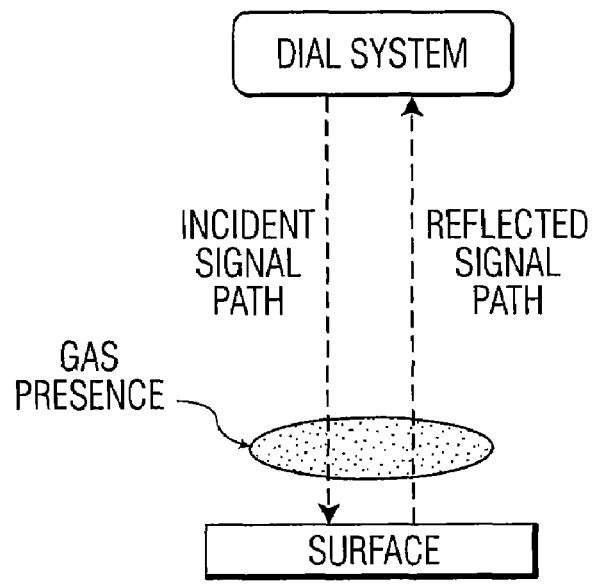
FIGS. 7D through 7F are illustrations of another conventional DIAL system, in which the ON-line pulse and the OFF-line pulse have different intensities upon return to the DIAL system, in the presence of a target gas that absorbs the ON-line pulse.
Figure 7E:
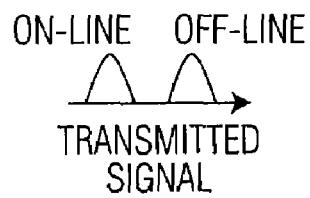
Figure 7F:
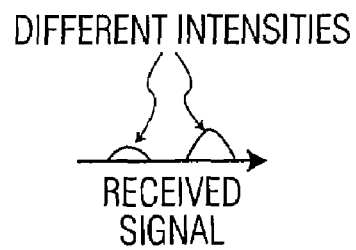

This condition is shown in FIG. 6. When this happens, the invention estimates the location of the ON-line pulse. The OFF-line location of the reflected pulse is known along with the temporal inter-pulse separation of a copy of the transmitted captured pulse. Using these known locations, the location of the ON-line reflected pulse may be estimated, according to Equation 5 as follows:

$$LOC_1^R \pm \Delta T \quad (5).$$

The $\pm$ is used in the following manner: (i) if the ON-line pulse is first in the transmitted sequence then a minus (−) is used, (ii) if the ON-line pulse is second in the transmitted sequence a plus (+) is used.

The method may use all the samples of the captured reflected signal. In order to minimize computer memory usage and increase computational efficiency, however, only a portion of the captured reflected signal may be processed. This portion of the signal may be extracted from the total signal using $R_S$ and $R_E$, previously defined.

The following equations may be used to translate the range quantities of $R_S$ and $R_E$ (meters) to indices used to extract the smaller portion of the signal to be processed.

$$PI_S = \left\lfloor \left(\frac{2R_S}{c}\right) * T_S \right\rfloor \ \& \ PI_E = \left\lfloor \left(\frac{2R_E}{c}\right) * T_S \right\rfloor \quad (6)$$

where
$R_S$ is the range window start,
$R_E$ is the range window end, and
$T_S$ is the sampling rate of the system.
$PI_S$ and $PI_E$ correspond to the start and end indices used in the data extraction.

The above method may be extended to a three-laser DIAL system, or to an N-laser DIAL system (N greater than three).

Having described the peak-based method of the present invention, the semi-matched filter-based method of the present invention is described next. This method also finds the location of the pulses in the reflected signal. The method includes the following steps (enumerated as steps 11 through 14):

Step 11. For the pulse being processed, create a digital filter of length $L_F = LOC_1^C + LOC_2^C$ using Equation 7, as follows:

$$h[n] = \begin{cases} 1 & \text{when} \quad n = 0 \\ 1 & \text{when} \quad n = LOC_1^C + LOC_2^C - 1 \\ 0 & \text{otherwise} \end{cases} \quad (7)$$

Where:
$LOC_1^C$ is the location of the maximum value of the first pulse found in the captured reflected signal in samples (sample number),
$LOC_2^C$ is the location of the maximum value of the second pulse found in the captured reflected signal in samples (sample number), and n is the number of samples (an integer) in the captured data stream.

Step 12. Convolve or filter the sample stream of the captured reflected signal with the filter created in step 11 to generate another signal, y[n], where n are discrete points of the signal y[n].

Step 13. Find the peak value in y[n]. This peak value corresponds to the sample number in the convolution when the "ones" of the filter line up with the peaks of the signal at the correct separation. Next, record the intensity (peak value) and location (sample number), as follows:

$PV_R$ & $LOC_R$.

The locations of the pulses are calculated, as follows:

$$LOC_1^R = LOC_R - L_F + 1 \quad (8)$$
$$LOC_2^R = LOC_1^R + \Delta T.$$

As in the previous embodiment (peak based algorithm), the method of this embodiment (semi-matched filter algorithm) may use all the samples of the captured reflected signal. In order to minimize computer memory usage and increase computational efficiency, however, only a portion of the captured reflected signal may be processed. This portion of the signal may be extracted from the total signal using $R_S$ and $R_E$, previously defined.

The following equations may be used to translate the range quantities of $R_S$ and $R_E$ (meters) to indices used to extract the smaller portion of the signal to be processed:

$$PI_S = \left\lfloor \left(\frac{2R_S}{c}\right) * T_S \right\rfloor \ \& \ PI_E = \left\lfloor \left(\frac{2R_E}{c}\right) * T_S \right\rfloor \quad (6)$$

where:
$R_S$ is the range window start,
$R_E$ is the range window end, and
$T_S$ is the sampling rate of the system.
$PI_S$ and $PI_E$ correspond to the start and end indices used in the data extraction.

The above method may also be extended to a three-laser DIAL system, or an N-laser DIAL system (N greater than three).

Although the invention is illustrated and described herein with reference to specific embodiments, the invention is not intended to be limited to the details shown. Rather, various modifications may be made in the details within the scope and range of equivalents of the claims and without departing from the invention.

The invention claimed is:

1. In a system for remotely measuring characteristics of a target scene, a method of finding a temporal location of a reflected pulse, in a two or more pulse sequence, comprising the steps of:
   (a) transmitting a pulse burst toward the target scene;
   (b) capturing a copy of the pulse burst transmitted in step (a);
   (c) measuring an inter-pulse separation between two pulses in the pulse burst captured in step (b);
   (d) receiving a signal reflected from the target scene;
   (e) determining a temporal location of a first pulse in the signal received in step (d); and
   (f) determining a temporal location of a second pulse in the signal received in step (d), based on the inter-pulse separation measured in step (c);
   wherein step (e) includes determining a temporal location of a pulse having a maximum peak level in the signal, and denoting that pulse as the first pulse in the signal, and
   step (f) includes determining the location of the second pulse in the signal by summing the temporal location of the first pulse with the inter-pulse separation measured in step (c).

2. The method of claim 1 wherein
step (a) includes transmitting an OFF-line pulse and at least one ON-line pulse in the pulse burst toward the target scene from a differential absorption LIDAR (DIAL) system, and
the OFF-line pulse and the ON-line pulse are combined pulses, each individually generated from a separate pulsed laser transmitter and each having a different wavelength.

3. The method of claim 1 wherein
the first pulse in the signal is further processed as an OFF-line pulse transmitted by and received from a DIAL system, and
the second pulse in the signal is further processed as an ON-line pulse, separately transmitted by and separately received from the DIAL system.

4. The method of claim 1 wherein
step (f) includes modifying the inter-pulse separation measured in step (c) based on a user assigned inter-pulse separation threshold, prior to summing the temporal location of the first pulse with the inter-pulse separation.

5. In a system for remotely measuring characteristics of a target scene, a method of finding a temporal location of a reflected pulse, in a two or more pulse sequence, comprising the steps of:
   (a) transmitting a stream of pulse bursts toward the target scene;
   (b) sampling a copy of the stream transmitted in step (a);
   (c) determining first and second sample numbers as respective locations of first and second pulses in the stream of pulse bursts sampled in step (b);
   (d) forming a digital filter;
   (e) convolving a stream of pulses reflected from the target scene with the digital filter to generate a discrete signal;
   (f) locating a highest peak point in the discrete signal and denoting the point as a temporal location of a first pulse in the reflected stream that corresponds to the first pulse in the stream of pulse bursts sampled in step (b);
   (g) measuring an inter-pulse separation between the first pulse and the second pulse in the stream of pulse bursts sampled in step (b); and
   (h) determining a location of the second pulse in the reflected stream, based on the temporal location of the first pulse located in step (f) and the inter-pulse separation measured in step (g).

6. The method of claim 5 wherein forming the digital filter includes forming h[n] of length $L_F = LOC_1^C + LOC_2^C$, as follows:

$$h[n] = \begin{cases} 1 & \text{when} & n = 0 \\ 1 & \text{when} & n = LOC_1^C + LOC_2^C - 1 \\ 0 & \text{otherwise} \end{cases}$$

where:
$LOC_1^C$ is the sample number of the maximum value of the first pulse found in the transmitted stream of pulse bursts,
$LOC_2^C$ is the sample number of the maximum value of the second pulse found in the transmitted stream of pulse bursts, and
n is an integer of a number of samples.

7. The method of claim 5 wherein
step (a) includes transmitting the stream of pulse bursts having an OFF-line pulse and at least one ON-line pulse from a differential absorption LIDAR (DIAL) system, and
the OFF-line pulse and the ON-line pulse are combined pulses, each individually generated from a separate pulsed laser transmitter and each having a different wavelength.

8. The method of claim 7 wherein step (c) includes
assigning the OFF-line pulse to correspond to the respective location of the first pulse in the transmitted stream of pulse bursts, and assigning the ON-line pulse to correspond to the respective location of the second pulse in the transmitted stream of pulse bursts.

9. The method of claim 6 wherein
step (f) includes locating the highest peak point among n points in the discrete signal.

10. A system having a transmitter for transmitting a pulse burst toward a target scene and a receiver for receiving a signal reflected from the target scene, the system comprising
a capture system, coupled to the transmitter, configured to capture a copy of the pulse burst transmitted from the transmitter,
a parameter estimation module, coupled to the capture system, for measuring at least one inter-pulse separation between at least two pulses in the copied pulse burst transmitted from the transmitter, and
a pulse finding module, coupled to the receiver and the parameter estimation module, for determining temporal first and second locations of the first and second pulses, respectively, in the signal received by the receiver,
wherein the temporal location of the second pulse is determined based on the inter-pulse separation measured by the parameter estimation module,
the pulse finding module is configured to determine a temporal location of a pulse having a maximum peak level in the signal received by the receiver, and denote that pulse as the first pulse, and
configured to determine the location of the second pulse by summing the temporal location of the first pulse with the inter-pulse separation measured by the parameter estimation module.

11. The system of claim 10 wherein
the transmitter is configured to transmit an OFF-line pulse and at least one ON-line pulse in the pulse burst toward the target scene from a differential absorption LIDAR (DIAL) system, and
the OFF-line pulse and the ON-line pulse are combined pulses, each individually generated from a separate pulsed laser transmitter and each having a different wavelength.

12. The system of claim 10 wherein
the first pulse of the signal received by the receiver is processed as an OFF-line pulse received from a DIAL system, and
the second pulse of the signal received by the receiver is processed as an ON-line pulse, separately received from the DIAL system.

13. The system of claim 10 wherein
the inter-pulse separation measured by the parameter estimation module is based on a user assigned inter-pulse separation threshold.

14. A system having a transmitter for transmitting a stream of pulse bursts toward a target scene, and a receiver for receiving a signal reflected from the target scene, the system comprising
a capture system, coupled to the transmitter, configured to sample a copy of the stream of pulse bursts transmitted from the transmitter, a parameter estimation module, coupled to the capture system, configured to determine first and second sample numbers, as respective locations of first and second pulses in the stream of pulse bursts transmitted from the transmitter, and provide an inter-pulse separation between the first and second pulses to a pulse finding module, and
the pulse finding module including a digital filter, coupled to the receiver and the parameter estimation module, for (a) convolving a stream of pulses reflected from the target scene with the digital filter to generate a discrete signal, and (b) locating a highest peak point in the discrete signal and denoting the point as a temporal location of a first pulse in the reflected stream that corresponds to the first pulse in the stream of pulse bursts, wherein the pulse finding module is configured to determine a location of the second pulse in the reflected stream based on the temporal location of the first pulse and the inter-pulse separation, and provide the determined location to a processor.

15. The system of claim 14 wherein
the digital filter, h[n], is of length $L_F = LOC_1^C + LOC_2^C$, and defined as follows:

$$h[n] = \begin{cases} 1 & \text{when} & n = 0 \\ 1 & \text{when} & n = LOC_1^C + LOC_2^C - 1 \\ 0 & \text{otherwise} \end{cases}$$

where:
$LOC_1^C$ is the sample number of the maximum value of the first pulse found in the transmitted stream of pulse bursts,
$LOC_2^C$ is the sample number of maximum value of the second pulse found in the transmitted stream of pulse bursts, and
n is an integer of a number of samples.

16. The system of claim 14 wherein
the transmitter is configured to transmit the stream of pulse bursts as an OFF-line pulse and at least one ON-line pulse from a differential absorption LIDAR (DIAL) system, and
the OFF-line pulse and the ON-line pulse are combined pulses, each individually generated from a separate pulsed laser transmitter and each having a different wavelength.

17. The system of claim 16 wherein
the OFF-line pulse corresponds to the respective location of the first pulse in the transmitted stream of pulse bursts, and
the ON-line pulse correspond to the respective location of the second pulse in the transmitted stream of pulse bursts.

18. The system of claim 15 wherein
the pulse finding module is configured to locate the highest peak point among n points in the discrete signal.

* * * * *